US012672178B2

(12) United States Patent
Balasubramaniam et al.

(10) Patent No.: US 12,672,178 B2
(45) Date of Patent: Jun. 30, 2026

(54) METHOD OF INTRA-NEXT-GENERATION-NODE-B MOBILITY

(71) Applicant: Nokia Technologies Oy, Espoo (FI)

(72) Inventors: Sankaran Balasubramaniam, Bangalore (IN); Subramanya Chandrashekar, Bangalore (IN); Raghuram Reddy Krishnamurthy, Bangalore (IN); Suresh P Nair, Estero, FL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 445 days.

(21) Appl. No.: 18/332,342

(22) Filed: Jun. 9, 2023

(65) Prior Publication Data

US 2024/0023176 A1     Jan. 18, 2024

(30) Foreign Application Priority Data

Jul. 14, 2022    (IN) .............................. 202241040435

(51) Int. Cl.
　　*H04W 76/11*　　　(2018.01)
　　*H04W 12/041*　　(2021.01)
　　　　　　(Continued)
(52) U.S. Cl.
　　CPC ......... *H04W 76/12* (2018.02); *H04W 12/041* (2021.01); *H04W 72/1273* (2013.01); *H04W 76/11* (2018.02)
(58) Field of Classification Search
　　CPC ............... H04W 76/12; H04W 12/041; H04W 72/1273; H04W 76/11; H04W 36/0038; H04W 36/087; H04W 88/085
　　See application file for complete search history.

(56) References Cited

U.S. PATENT DOCUMENTS

2019/0342800 A1　11/2019　Sirotkin et al.
2020/0077287 A1*　 3/2020　Prasad ................... H04W 72/30
　　　　　　(Continued)

FOREIGN PATENT DOCUMENTS

CN　　　108541032 B　 *　4/2022　.......... H04W 36/087
WO　　2021/155938 A1　　8/2021
　　　　　　(Continued)

OTHER PUBLICATIONS

PCT Application No. PCT/EP2022/063229, "Method and Apparatus for Controlling A User Device", filed on May 17, 2022, pp. 1-31.
　　　　　　(Continued)

*Primary Examiner* — Lakeram Jangbahadur
(74) *Attorney, Agent, or Firm* — Carter, DeLuca & Farrell LLP

(57)　　　　　ABSTRACT

Systems, methods, apparatuses, and computer program products for a method of mobility between distributed units with a local control plane are provided. For example, a method can include detecting, at a target distributed unit, a handover based on an indication from a source distributed unit after a handover command has been sent to a user equipment to hand over from the source distributed unit to the target distributed unit. The method can also include sending, from the target distributed unit to a central unit user plane, a data transmission resume notification, to trigger to the central unit user plane to resume downlink data transmission toward the target distributed unit. The downlink data transmission was previously suspended by instructions from a source distributed unit to the central unit user plane when the handover was initiated from the source distributed unit to the target distributed unit.

5 Claims, 4 Drawing Sheets

(51) Int. Cl.
    *H04W 72/1273*      (2023.01)
    *H04W 76/12*       (2018.01)

(56)            References Cited

U.S. PATENT DOCUMENTS

| | | | |
|---|---|---|---|
| 2021/0176802 A1* | 6/2021 | Sirotkin | H04W 88/085 |
| 2023/0164650 A1* | 5/2023 | Wu | H04W 36/0061 |
| | | | 370/331 |
| 2023/0189096 A1* | 6/2023 | Barac | H04W 36/0064 |
| | | | 370/331 |
| 2025/0113277 A1* | 4/2025 | Persson | H04W 36/249 |

FOREIGN PATENT DOCUMENTS

| | | | |
|---|---|---|---|
| WO | 2021/206826 A1 | 10/2021 |
| WO | 2022/038308 A1 | 2/2022 |

OTHER PUBLICATIONS

"3rd Generation Partnership Project; Technical Specification Group Services and System Aspects; Security architecture and procedures for 5G system (Release 17)", 3GPP TS 33.501, V17.5.0, Mar. 2022, pp. 1-293.
Yin et al., "General Architecture of Centralized Unit and Distributed Unit for New Radio", ZTE Communications, vol. 16, No. 2, Jun. 2018, pp. 23-31.

* cited by examiner

~310

Receive TEID
Container

~320

Store TEID Container
for Future HO

~312

Detect HO

~322

Send Data
Transmission
Resume Notification

~314

Receive Instructions
to Suspend DL Data
Transmission

~324

Resume DL Data
Transmission

~316

Determine Security
Keys for Target DU

~306

Receive List of
Potential Target DUs

~326

Send Security Keys to
Target DU

METHOD OF
INTRA-NEXT-GENERATION-NODE-B
MOBILITY

RELATED APPLICATION

This application claims priority to IN Provisional Application No. 202241040435 filed Jul. 14, 2022, which is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems including subsequent generations of the same or similar standards. For example, certain example embodiments may generally relate to systems and/or methods for providing a method of mobility between distributed units with a local control plane.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. From release 18 (Rel-18) onward, 5G is referred to as 5G advanced. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 6G is currently under development and may replace 5G and 5G advanced.

SUMMARY

An embodiment may be directed to an apparatus. The apparatus can include at least one processor and at least memory including computer program. The at least one memory and the computer program can be configured to, with the at least one processor, cause the apparatus at least to perform receiving, by a central unit user plane from a source distributed unit, a tunnel endpoint identifier container, the container containing downlink tunnel endpoint identifiers of data radio bearers prepared at a target cell, wherein the container is provided upon preparation of the target cell. Alternatively, the at least one memory and the computer program can be configured to, with the at least one processor, cause the apparatus at least to perform receiving, by the central unit user plane from a target distributed unit, the tunnel endpoint identifier container. The container can contain downlink tunnel endpoint identifiers of data radio bearers prepared at the target cell. The container can be provided upon reception of a message from the source distributed unit to proceed with handing over from the source distributed unit to the target distributed unit in the target cell. As another alternative, the at least one memory and the computer program can be configured to, with the at least one processor, cause the apparatus at least to perform receiving, by the central unit user plane from the target distributed unit, the tunnel endpoint identifier container. The container can contain downlink tunnel endpoint identifiers of data radio bearers prepared at the target cell. The container can be provided upon successful random access completion by a user equipment being handed over from the source distributed unit to the target distributed unit.

An embodiment may be directed to an apparatus. The apparatus can include at least one processor and at least memory including computer program. The at least one memory and the computer program can be configured to, with the at least one processor, cause the apparatus at least to perform detecting, at a target distributed unit, a handover based on an indication from a source distributed unit after a handover command has been sent to a user equipment to hand over from the source distributed unit to the target distributed unit, based on completion of random access, or based on an indication from the user equipment of the handover. The at least one memory and the computer program can also be configured to, with the at least one processor, cause the apparatus at least to perform sending, from the target distributed unit to a central unit user plane, a data transmission resume notification, to trigger to the central unit user plane to resume downlink data transmission toward the target distributed unit. The downlink data transmission may have been previously suspended by instructions from a source distributed unit to the central unit user plane when the handover was initiated from the source distributed unit to the target distributed unit.

An embodiment may be directed to an apparatus. The apparatus can include at least one processor and at least memory including computer program. The at least one memory and the computer program can be configured to, with the at least one processor, cause the apparatus at least to perform receiving, at a central unit control plane from a source distributed unit or target distributed unit, instructions to suspend downlink data transmission of the central unit user plane when a handover is initiated from the source distributed unit to the target distributed unit. The at least one memory and the computer program can also be configured to, with the at least one processor, cause the apparatus at least to perform resuming downlink data transmission from the central unit user plane toward the target distributed unit based on receiving a data transmission resume notification from the target distributed unit or based on receiving new downlink tunnel endpoint identifiers from the source distributed unit.

An embodiment may be directed to an apparatus. The apparatus can include at least one processor and at least memory including computer program. The at least one memory and the computer program can be configured to, with the at least one processor, cause the apparatus at least to perform determining security keys for a target distributed unit. The at least one memory and the computer program can also be configured to, with the at least one processor, cause the apparatus at least to perform sending the security keys to the target distributed unit.

An embodiment may be directed to a method. The method can include receiving, by a central unit user plane from a source distributed unit, a tunnel endpoint identifier container, the container containing downlink tunnel endpoint identifiers of data radio bearers prepared at a target cell, wherein the container is provided upon preparation of the target cell. Alternatively, the method can include receiving, by the central unit user plane from a target distributed unit, the tunnel endpoint identifier container. The container can contain downlink tunnel endpoint identifiers of data radio bearers prepared at the target cell. The container can be provided upon reception of a message from the source distributed unit to proceed with handing over from the source distributed unit to the target distributed unit in the target cell. As another alternative, the method can include receiving, by the central unit user plane from the target distributed unit, the tunnel endpoint identifier container. The container can contain downlink tunnel endpoint identifiers of data radio bearers prepared at the target cell. The container can be provided upon successful random access completion by a user equipment being handed over from the source distributed unit to the target distributed unit.

An embodiment may be directed to a method. The method can include detecting, at a target distributed unit, a handover based on an indication from a source distributed unit after a handover command has been sent to a user equipment to hand over from the source distributed unit to the target distributed unit, based on completion of random access, or based on an indication from the user equipment of the handover. The method can also include sending, from the target distributed unit to a central unit user plane, a data transmission resume notification, to trigger to the central unit user plane to resume downlink data transmission toward the target distributed unit. The downlink data transmission may have been previously suspended by instructions from a source distributed unit to the central unit user plane when the handover was initiated from the source distributed unit to the target distributed unit.

An embodiment can be directed to a method. The method can include receiving, at a central unit control plane from a source distributed unit or target distributed unit, instructions to suspend downlink data transmission of the central unit user plane when a handover is initiated from the source distributed unit to the target distributed unit. The method can also include resuming downlink data transmission from the central unit user plane toward the target distributed unit based on receiving a data transmission resume notification from the target distributed unit or based on receiving new downlink tunnel endpoint identifiers from the source distributed unit.

An embodiment can be directed to a method. The method can include determining security keys for a target distributed unit. The method can also include sending the security keys to the target distributed unit.

An embodiment can be directed to an apparatus. The apparatus can include means for receiving, by a central unit user plane from a source distributed unit, a tunnel endpoint identifier container, the container containing downlink tunnel endpoint identifiers of data radio bearers prepared at a target cell, wherein the container is provided upon preparation of the target cell. Alternatively, the apparatus can include means for receiving, by the central unit user plane from a target distributed unit, the tunnel endpoint identifier container. The container can contain downlink tunnel endpoint identifiers of data radio bearers prepared at the target cell. The container can be provided upon reception of a message from the source distributed unit to proceed with handing over from the source distributed unit to the target distributed unit in the target cell. As another alternative, the apparatus can include means for receiving, by the central unit user plane from the target distributed unit, the tunnel endpoint identifier container. The container can contain downlink tunnel endpoint identifiers of data radio bearers prepared at the target cell. The container can be provided upon successful random access completion by a user equipment being handed over from the source distributed unit to the target distributed unit.

An embodiment can be directed to an apparatus. The apparatus can include means for detecting, at a target distributed unit, a handover based on an indication from a source distributed unit after a handover command has been sent to a user equipment to hand over from the source distributed unit to the target distributed unit, based on completion of random access, or based on an indication from the user equipment of the handover. The apparatus can also include means for sending, from the target distributed unit to a central unit user plane, a data transmission resume notification, to trigger to the central unit user plane to resume downlink data transmission toward the target distributed unit. The downlink data transmission may have been previously suspended by instructions from a source distributed unit to the central unit user plane when the handover was initiated from the source distributed unit to the target distributed unit.

An embodiment can be directed to an apparatus. The apparatus can include means for receiving, at a central unit control plane from a source distributed unit or target distributed unit, instructions to suspend downlink data transmission of the central unit user plane when a handover is initiated from the source distributed unit to the target distributed unit. The apparatus can also include means for resuming downlink data transmission from the central unit user plane toward the target distributed unit based on receiving a data transmission resume notification from the target distributed unit or based on receiving new downlink tunnel endpoint identifiers from the source distributed unit.

An embodiment can be directed to an apparatus. The apparatus can include means for determining security keys for a target distributed unit. The apparatus can also include means for sending the security keys to the target distributed unit.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing a method of mobility between distributed units with a local control plane, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

In a disaggregated architecture, such as a next generation radio access network (NG-RAN) architecture, the intra next generation node B distributed unit (gNB-DU) and inter gNB-DU handover (HO) procedure can be managed by a gNB central unit control plane (gNB-CU-CP). It has to interact with the source gNB-DU, target gNB-DU, user equipment (UE) and gNB CU user plane (gNB-CU-UP) to complete the HO signaling.

Figure 1:
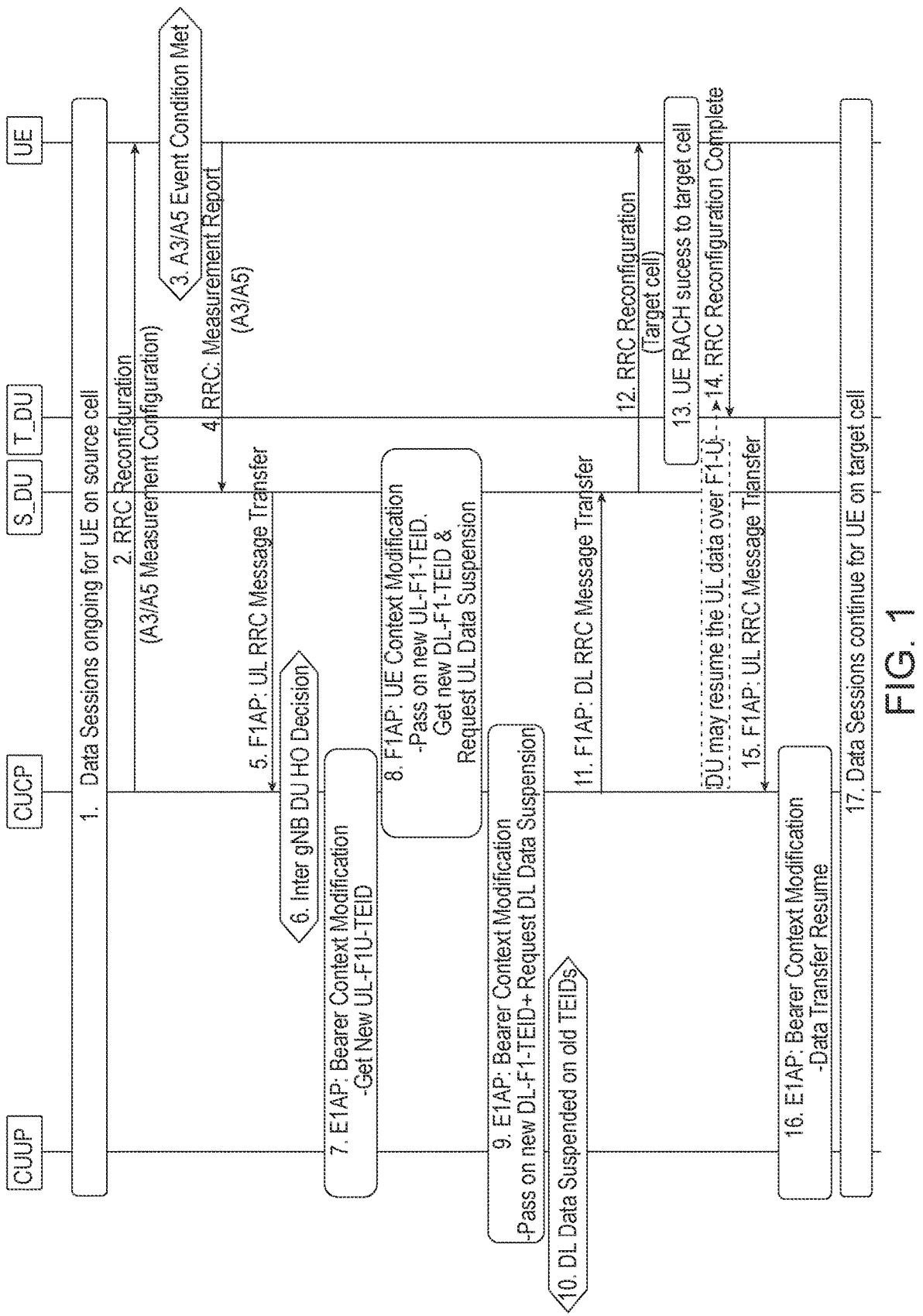
FIG. 1 illustrates an inter next generation node B distributed unit handover procedure.

FIG. 1 illustrates an inter next generation node B distributed unit handover procedure. As shown at 1, data sessions can be ongoing for a user equipment in a source cell. This session can involve the central unit user plane (CUUP), central unit control plane (CUCP), a source distributed unit (S_DU), a target distributed unit (T_DU), and the UE itself.

At 2, the CUUP can send a radio resource control (RRC) reconfiguration with an A3/A5 measurement configuration to the UE. At 3, the UE can determine that the A3/A5 event condition is met. Accordingly, at 4, the UE can send an RRC measurement report for the A3/A5 event to the source DU.

AT 5, using F1AP, the source DU can send an uplink RRC message transfer to the CUCP. The CUCP can, at 6, the CUCP can make an inter gNB-DU handover decision. Accordingly, the CUCP and CUUP can use E1AP to perform bearer context modification and get a new uplink F1U tunneling endpoint identifier.

At 8, the CUCP can use F1AP to perform a UE context modification with the source DU. The CUCP can pass on the new UL-F1-TEID, get a new downlink F1 TEID and request UL data suspension. Then, at 9, the CUCP and CUUP can perform a bearer context modification using E1AP. The process can include passing on the new DL-F1-TEID and requesting downlink data suspension.

At 10, the CUUP can suspend DL data on old TEIDs. At 11, the CUUP can provide DL RRC message transfer to the source DU using F1AP. Then the source DU can send an RRC reconfiguration to the UE to handover to the target DU, at 12. Accordingly, at 13, the UE can attempt random access and succeed in establishing access using a random access channel (RACH) to the target cell, namely the target DU. AT 14, the UE can provide an RRC reconfiguration complete to the target DU. The DU may resume the UL data over F1-U to the UE.

At 15, the target UE can send an UL RRC message transfer using F1AP to the CUCP. The CUCP and CUUP can then, at 16, use E1AP to perform bearer context modification, and data transfer can resume. Finally, at 17, data session(s) for the UE can continue on the target cell.

The procedures illustrated in FIG. 1 represent a simplified call flow for the inter gNB-DU HO procedure. There can be a variety of observations regarding this approach. For example, in this approach, among various functions, the gNB-CU-CP can serve as an in-between entity in forwarding configurations between the source/target DUs and the gNB-CU-UP. This in-between role can lead to complex signaling and additional latency in the whole procedure. The central role of the gNB-CU-CP can add to the hops without adding any real value in some steps. For example, there may be no particular benefit in the passing of the UL and DL F1AP TEIDs between CUUP and DUs.

Also, in the approach of FIG. 1, the E1AP/F1AP/RRC signaling can be done sequentially by the gNB-CU-CP due to the inter-dependencies. This may also lead to potential delays.

Furthermore, at 3, the UE can detect a possible deterioration in the serving cell, or a better neighbor cell. In this example, though, the UE waits for the RRC reconfiguration with a HO to a target cell at 12. If there is a delay in it getting this message, the UE may declare radio link failure (RLF) and may attempt RRC re-establishment or go to idle. Given that there are multiple F1AP and E1AP procedures between 3 and 12, this delay may impact UE connectivity and produce user-plane interruption as well.

Moreover, in case of advanced mobility procedures, such as conditional handover (CHO), dual active protocol stack (DAPS), lower layer mobility (LLM), or the like, because the target cell configurations are prepared in advance, the re-configurations may be impacted by this additional latency.

In view of these issues, certain embodiments may be provided. For example, certain embodiments may help to prevent potential call drops, overall bad user experience and bad network key performance indicators (KPIs).

The local control plane (C-Plane) architecture mentioned above can be improved by certain embodiments. For example, certain embodiments may improve the signaling in inter gNB-DU and intra gNB-DU handover procedures. Certain embodiments enable parallel handling at the source gNB-DU, further reducing the time taken for the whole procedure. The reduction in signaling and parallelization can lead to reduced delay experienced by the UE before 3 and 12 in FIG. 1. This reduction in delay may further reduce the chances of call drop and may provide overall improvement in user experience and network KPIs.

Certain embodiments may have various aspects including various options and alternatives that may be used together in any desired combination. For example, according to certain aspects, after target cell(s) preparation, the source DU can provide a tunnel endpoint identifier (TEID) container using a control-protocol data unit (PDU) over F1-U interface to the CU-UP. This container can include all the DL TEIDs of all DRBs prepared at the target cell(s).

Alternatively, such a TEID container can be sent from source DU to CU-CP over F1-C and from CU-CP to CU-UP over E1. This incurs additional signaling. Change of DL TEID may also be needed in case of intra gNB-DU HOs as the RLC PDUs before and after serving cell change may need to be distinguished, which can be an aspect of RLC re-establishment.

Another alternative can be that the source DU acknowledges the configuration from the target DU and signals to the target DU to proceed with the HO after sending the HO command. On reception on such indication, the target DU can signal the allocated DL TEID(s) for the DRB(s) to the CU-UP. However, this extra hop for the message exchange can introduce additional delay.

In another alternative, the target gNB-DU can send the F1-U DL TEID associated with the DRB(s) directly to the CU-UP at the end of the HO procedure, such as upon successful RACH completion.

In another aspect, the source gNB-DU can send a control-PDU to CU-UP to suspend the DL data transmission when the HO is initiated. For example, the control-PDU can be sent as soon as the source gNB-DU is aware an inter gNB-DU HO decision is made.

In the case of network controlled HOs like legacy baseline HO, lower layer mobility (LLM), the source gNB-DU can send an indication to the target gNB-DU after sending the HO command to the UE. In the case of UE executed HOs like CHO, the target gNB-DU may detect HO based on RACH completion or the UE may send an UL medium access control (MAC) control element (CE) to indicate the same.

Based on the indication of the HO, the target gNB-DU can send a data transmission resume notification to the CU-UP using a control-PDU over F1-U. This notification can trigger the CU-UP to resume DL data transmission at the target. As another option, the CU-UP can resume the DL data transmission on receiving the new DL TEID(s) from the source DU, which may reduce the data interruption upon successful RACH completion.

Certain embodiments may relate to security aspects of the system. For example, in an alternative according to certain embodiments, if the source gNB-DU and target gNB-DU are in the same operator management domain, the source gNB-DU can compute security keys for the target gNB-DU and the target gNB-DU's local control plane (L-CP) from the security key parameters provided by the CU-CP and can send the keys to the target gNB-DU. The target gNB-DU can perform a security key update based on the security key parameters provided by source gNB-DU, as in horizontal key derivation described in third generation partnership (3GPP) technical specification (TS) 33.501 clause 6.9.2.3.

In another alternative according to certain embodiments, if the source gNB-DU and target gNB-DU are in different operator management domain, then the key computation can be similar to a N2 handover as described in 3GPP TS 33.501 using keys precomputed for the potential target gNB-DUs and the UE. The CU-CP can pre-compute these keys and can share with the potential gNB-DUs and the UE for anticipated handover in the future. For security isolation between the gNB-DUs in the different operator management domains, the CU-CP can send such gNB-DUs and the UE, keys to be used by specific gNB-DU.

The pre-computed keys for potential target gNB-DUs may be determined by CU-CP proactively or the serving gNB-DU may identify the potential target gNB-DUs and send the list of target gNB-DUs to the CU-CP over an F1 procedure, such as a UE context modification request. The potential target gNB-DUs may be identified using measurements received by gNB-DU or L-CP.

The above key management may be only for the local signaling radio bearer (SRB), used by L-CP, terminating at DU. However the packet data convergence protocol (PDCP) anchor point for the DRB(s) and SRB(s) terminating at the CU may not change, and consequently there may be no impact to those security keys to be used at the CU CP and CU UP. The L-CP keys described are additional keys in the key hierarchy.

Figure 2:
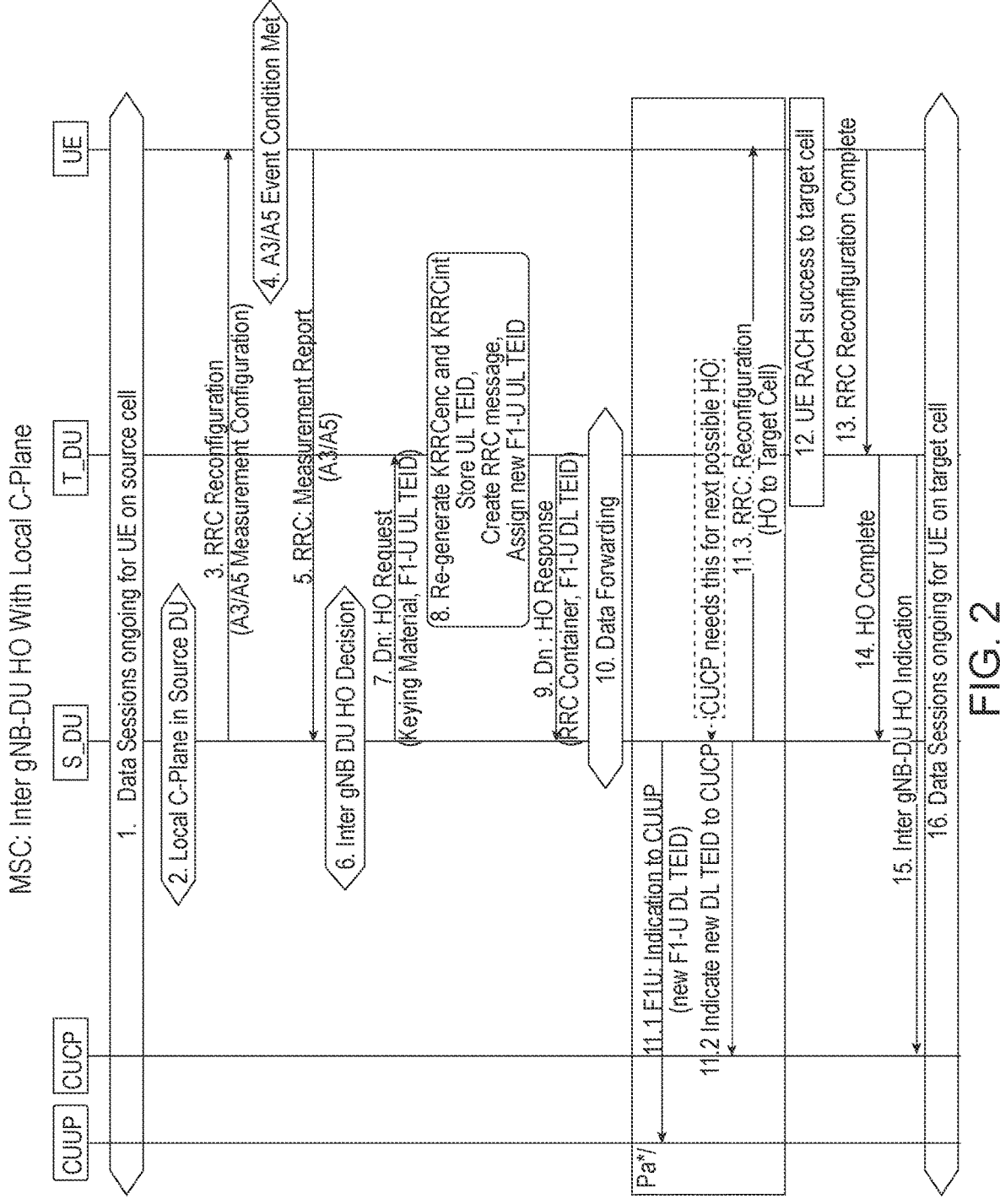
FIG. 2 illustrates a signal flow diagram of an inter next generation node B distributed unit handover with a local control plane, according to certain embodiments.

FIG. 2 illustrates a signal flow diagram of an inter next generation node B distributed unit handover with a local control plane, according to certain embodiments. As can be seen from a comparison between FIG. 1 and FIG. 2, the procedures at 1, 2, 3, and 4 in FIG. 1 correspond to the procedures at 1, 3, 4, and 5 in FIG. 2. At 2, in FIG. 2, there can be a local control plane in the source DU. More particularly, L-CP can be supported in the source DU as well as in the target DU.

At 3 in FIG. 2, the L-CP can send the measurement configuration for A3/A5 to the UE. The L-CP can learn of the intra-gNB neighbor cell information over the DU-DU Dn interface setup. Alternatively, the CU-CP can share the neighbor cell information of all the adjacent DUs to each DU during Dn setup.

At 4, in FIG. 2, the events A3/A5 can be detected at the UE.

Because of the local control plane, at 6 the inter gNB-DU HO decision can be performed without first sending an UL RRC message transfer over F1AP as at 5 in FIG. 1.

AT 6, in FIG. 2, the inter gNB-DU HO decision can be made in the source DU, as opposed to the gNB-CU-CP in the fifth generation (5G) architecture. Advanced HO mechanisms like CHO, LLM, or DAPS may also be employed instead of this.

As shown in FIG. 2, at 7 based on the HO decision at 6, the source DU can send a handover request to the target DU using Dn. The handover request can include keying material and F1-U UL TEID.

At 8, the target DU can regenerate $K_{RRC\text{-}enc}$ and $K_{RRC\text{-}int}$, store UL TEID, create an RRC message, and assign a new F1-U UL TEID. $K_{RRC\text{-}enc}$ and $K_{RRC\text{-}int}$ can be derived keys in the local CP of the target DU for encrypting and integrity protecting RRC traffic.

At 7 and 8, if the source gNB-DU and target gNB-DU are in the same operator management domain, and hence in the same security trust domain, the keying material can be provided by the source DU to the target DU, computed from the current security keys at the source gNB-DU. From the received keying material, the target gNB-DU can re-generate the $K_{RRC-enc}$ and $K_{RRC-int}$ for the PDCP entity that is associated with the L-CP.

If the source gNB-DU and target gNB-DU are in different operator management domain and thus different security trust domains, to maintain strict security isolation between the DUs, the keying material may be provided by the CU-CP to the target DUs in a {UE-ID, Security Token} format. A target gNB-DU can identify the UE using the UE-ID upon handover and can generate the $K_{RRC-enc}$ and $K_{RRC-int}$ from the Security Token, for the PDCP entity that is associated with the L-CP.

The potential target-DUs could be identified either by the CU-CP or by the serving gNB-DU, depending on the kind of mobility procedure. For example, in case of L3 HO or CHO, the CU-CP can determine the potential target DU, while in the case of lower layer mobility (LLM), the gNB-DU can determine the potential target DUs based on L1 measurements.

At 8 through 11.1, the target gNB-DU can generate the F1-U DL TEID and send to the CU-UP through the Source gNB-DU. The S-DU-CUUP signaling can happen directly using a container.

At 9, the target DU can send a handover response using Dn. The handover response can include an RRC container and F1-U DL TEID. Accordingly, at 10, data forwarding can begin.

At 11.1, the source DU can send an indication to the CU-UP using F1U, including the new F1-U DL TEID. At 11.2, the source DU can send an indication of the new DL TEID to the CUCP. The CUCP may benefit from this information in case of the next possible handover.

At 11.3 the source DU can send an RRC reconfiguration to the user equipment to hand over to the target cell. Thus, at 12, the UE can perform random access to the target distributed unit. At 13, when such random access is complete, the UE can send an RRC reconfiguration complete to the target DU. The target DU can, in turn at 14 send a handover complete message to the source DU and, at 15, provide an inter gNB-DU handover indication to the CUCP.

In the illustrated approach, the source gNB-DU may be enabled for parallel processing on two sides, namely with the target CUCP/CUUP and the UE. This parallel processing may reduce the overall time for the procedure. Additionally, the gNB-DU handling/anchoring the procedure may directly relieve the gNB-CU-CP of the intermediate role. This removal of the intermediate role may further reduce the signaling hop and the overall time taken for the procedure. Together, the parallel processing and relief of the intermediate role can ensure that the UE experiences less delay between procedures 4 and 16, thereby reducing the UE's chances of declaring RLF. The overall user experience and network KPIs may therefore be improved to a large extent. The same approach can also be applied for intra gNB-DU HO.

Figures 3A, 3B, 3C, 3D:
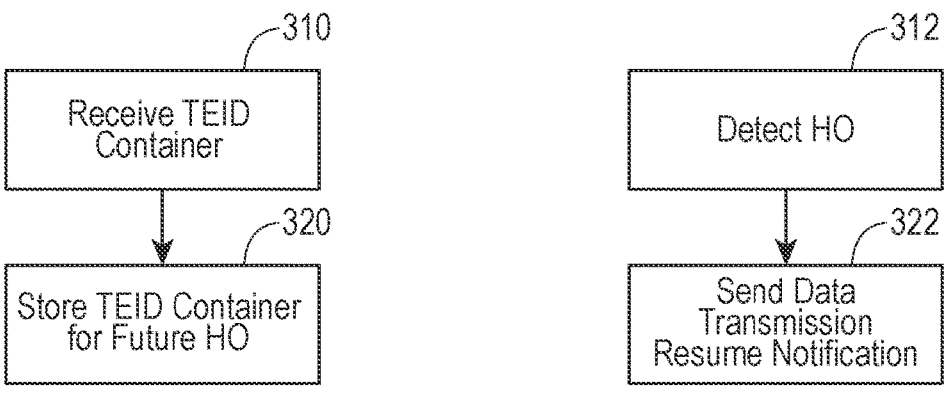
FIG. 3A illustrates a method for tunnel endpoint identifier container distribution, according to certain embodiments.
FIG. 3B illustrates a method of resuming data transmission by a target distributed unit after a handover, according to certain embodiments.
FIG. 3C illustrates a method of resuming data transmission by a central unit control plane after a handover, according to certain embodiments.
FIG. 3D illustrates security key distribution, according to certain embodiments.

FIG. 3A illustrates a method for tunnel endpoint identifier container distribution, according to certain embodiments. As shown in FIG. 3A, the method can include, at 310, receiving a TEID container. The receiving at 310 can include receiving, by a central unit user plane from a source distributed unit, a tunnel endpoint identifier container, the container containing downlink tunnel endpoint identifiers of data radio bearers prepared at a target cell. The container can be provided upon preparation of the target cell. Alternatively, the receiving at 310 can include receiving, by the central unit user plane from a target distributed unit, the tunnel endpoint identifier container, the container containing downlink tunnel endpoint identifiers of data radio bearers prepared at the target cell. The container can be provided upon reception of a message from the source distributed unit to proceed with handing over from the source distributed unit to the target distributed unit in the target cell. As another option, the receiving at 310 include receiving, by the central unit user plane from the target distributed unit, the tunnel endpoint identifier container, the container containing downlink tunnel endpoint identifiers of data radio bearers prepared at the target cell. The container can be provided upon successful random access completion by a user equipment being handed over from the source distributed unit to the target distributed unit.

The receiving, at 310, the tunnel endpoint identifier container can include receiving the tunnel endpoint identifier container directly at the central unit user plane over the user plane or indirectly at the central unit user plane via the central unit control plane using control plane signaling. Thus, for example, receiving a TEID container can be over the control plane via CU-CP or over the user plane as a control PDU over F1-U. The central unit user plane can, at 320, store the received TEID container, or at least any TEIDs from the container, so that they can be used for a future handover.

FIG. 3B illustrates a method of resuming data transmission by a target distributed unit after a handover, according to certain embodiments. As shown in FIG. 3B, a method can include, at 312, detecting, at a target distributed unit, a handover. The handover detection can be based on an indication from a source distributed unit after a handover command has been sent to a user equipment to hand over from the source distributed unit to the target distributed unit. As another option, the handover detection can be based on completion of random access. As a further option, the handover detection can be based on an indication from the user equipment of the handover.

The method can also include, at 322, sending, from the target distributed unit to a central unit user plane, a data transmission resume notification, to trigger to the central unit user plane to resume downlink data transmission toward the target distributed unit. The downlink data transmission may have been previously suspended by instructions from a source distributed unit to the central unit user plane when the handover was initiated from the source distributed unit to the target distributed unit.

FIG. 3C illustrates a method of resuming data transmission by a central unit control plane after a handover, according to certain embodiments. As shown in FIG. 3C, the method can include, at 314, receiving, at a central unit control plane from a source distributed unit or a target distributed unit, instructions to suspend downlink data transmission of the central unit user plane when a handover is initiated from the source distributed unit to the target distributed unit. The central unit control plane can accordingly suspend DL data transmission. At 324, the method can include resuming downlink data transmission from the central unit user plane toward the target distributed unit based on receiving a data transmission resume notification from the target distributed unit or based on receiving new downlink tunnel endpoint identifiers from the source distributed unit.

FIG. 3D illustrates security key distribution, according to certain embodiments. The method can include, at 316, determining security keys for a target distributed unit and, at 326, sending the security keys to the target distributed unit.

When, for example, a source distributed unit and the target distributed are in a same operator management domain or security domain, the determining at 316 can include computing the security keys by a source distributed unit based on security key parameters received from the central unit control plane, and the sending the security keys, at 326, can include sending, by the source distributed unit, the security keys to the target distributed unit.

When, for example, a source distributed unit and the target distributed unit are in different operator management domains or security domains, the determining, at 316, can include precomputing the security keys by the central unit control plane and the sending, at 326, can include sharing, by the central unit control plane, the security keys with the target distributed unit and a user equipment being handed over from the source distributed unit to the target distributed unit.

The precomputing can be performed prior to the handover. The precomputing can be performed proactively by the central unit control plane or the precomputing can be triggered by identification of a potential target distributed unit by the source distributed unit using distinguishing parameters specific to the target distributed unit.

The method can also include, at 306, receiving a list of potential target distributed units from the source distributed unit. The precomputing can be performed for each potential target distributed unit in the list.

Figure 4:
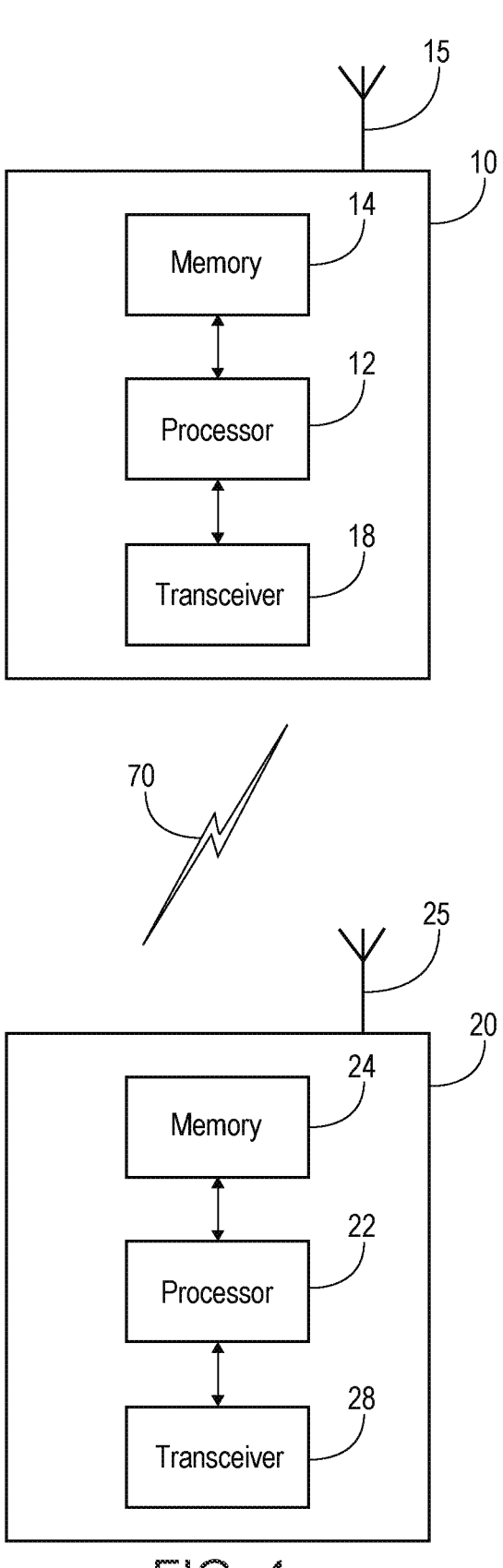
FIG. 4 illustrates an example block diagram of a system, according to an embodiment.

FIG. 4 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 4.

As illustrated in the example of FIG. 4, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 4, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be include any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-3D, or any other method described herein. In some embodiments, as discussed herein, apparatus 10 may be configured to perform a procedure relating to providing a method of mobility between distributed units with a local control plane, for example.

FIG. 4 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4.

As illustrated in the example of FIG. 4, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-3D, or any other method described herein. For example, in an embodiment, apparatus 20 may be controlled to perform a process relating to providing a method of mobility between distributed units with a local control plane, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may improve the signaling in inter gNB-DU and intra gNB-DU handover procedures. Certain embodiments enable parallel handling at the source gNB-DU, further reducing the time taken for the whole procedure. The reduction in signaling and parallelization can lead to reduced delay experienced by the UE. This reduction in delay may further reduce the chances of call drop and may provide overall improvement in user experience and network key performance indicators, thereby providing technological improvements.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY $K_{RRC-enc}$ and $K_{RRC-int}$—Derived keys in the gNB for encrypting and integrity protecting RRC traffic.
TEID—Terminal Endpoint ID used for GTP data path
RLF—Radio Link Failure
HO—Handover
PDCP—Packet Data Convergence Protocol
LLM—Lower Layer Mobility
L-CP—Local C-Plane
We claim:

1. An apparatus, comprising:
at least one processor; and
at least one memory including computer program code,
wherein the at least one memory and the computer program code are configured to, with the at least one processor, cause the apparatus at least to:
receive, by a central unit user plane of the apparatus from a source distributed unit, a tunnel endpoint identifier container, the container containing downlink tunnel endpoint identifiers of data radio bearers prepared at a target cell, wherein the container is provided upon preparation of the target cell; or

receive, by the central unit user plane from a target distributed unit, the tunnel endpoint identifier container, the container containing downlink tunnel endpoint identifiers of data radio bearers prepared at the target cell, wherein the container is provided upon reception of a message from the source distributed unit to proceed with handing over from the source distributed unit to the target distributed unit in the target cell; or receive, by the central unit user plane from the target distributed unit, the tunnel endpoint identifier container, the container containing downlink tunnel endpoint identifiers of data radio bearers prepared at the target cell, wherein the container is provided upon successful random access completion by a user equipment being handed over from the source distributed unit to the target distributed unit;

determine, by a central unit control plane of the apparatus, security keys for the target distributed unit; and
send the security keys to the target distributed unit,
wherein the determining comprises precomputing the security keys by the central unit control plane, wherein the sending comprises sharing, by the central unit control plane, the security keys with the target distributed unit and a user equipment being handed over from a source distributed unit to the target distributed unit, and wherein the precomputing is performed prior to the handover, and
wherein the precomputing the security keys is performed for a case in which the source distributed unit and the target distributed unit are in different operator management or security domains.

2. The apparatus of claim 1, wherein the receiving the tunnel endpoint identifier container comprises receiving the tunnel endpoint identifier container directly at the central unit user plane over user-plane or indirectly at the central unit user plane via the central unit control plane using control plane signaling.

3. The apparatus of claim 1, wherein the apparatus is further caused to:
receive, by a central unit control plane of the apparatus, the tunnel endpoint identifier container, the container containing downlink tunnel endpoint identifiers of data radio bearers prepared at a target cell.

4. The apparatus of claim 1, wherein the precomputing is performed proactively by the central unit control plane or wherein the precomputing is triggered by identification of a potential target distributed unit by the source distributed unit using distinguishing parameters specific to the target distributed unit.

5. The apparatus of claim 1, wherein the apparatus is further caused to:
receive a list of potential target distributed units from the source distributed unit, wherein the precomputing is performed for each potential target distributed unit in the list.

* * * * *